(12) United States Patent
Vitali

(10) Patent No.: US 12,009,954 B2
(45) Date of Patent: Jun. 11, 2024

(54) DEVICE AND METHOD FOR DECODING DATA FROM WIRELESS SIGNALS

(71) Applicant: STMICROELECTRONICS, INC., Coppell, TX (US)

(72) Inventor: Andrea Lorenzo Vitali, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 248 days.

(21) Appl. No.: 17/538,803

(22) Filed: Nov. 30, 2021

(65) Prior Publication Data

US 2023/0179457 A1  Jun. 8, 2023

(51) Int. Cl.
*H04L 27/06* (2006.01)

(52) U.S. Cl.
CPC .................................... *H04L 27/06* (2013.01)

(58) Field of Classification Search
CPC ...................................................... H04L 27/06
See application file for complete search history.

(56) References Cited

U.S. PATENT DOCUMENTS

| 7,450,666 B2 | 11/2008 | Miyanaga et al. |
| 9,960,643 B2 | 5/2018 | Gao et al. |
| 10,771,114 B2 | 9/2020 | Louis |
| 11,171,678 B2 | 11/2021 | Hoang et al. |
| 2008/0252367 A1 | 10/2008 | Pettersen et al. |
| 2009/0161785 A1 | 6/2009 | Nakamura |
| 2020/0280479 A1* | 9/2020 | Wilhelmsson ...... H04L 27/3809 |
| 2021/0135912 A1 | 5/2021 | Guedon |

FOREIGN PATENT DOCUMENTS

| CN | 106506419 B | 11/2019 |
| JP | 2000151728 A | 5/2000 |

OTHER PUBLICATIONS

IBM Corp., "Detector for Amplitude Shift Keyed Signal, " IBM Technical Disclosure Bulletin, vol. 31, No. 12, May 1989, pp. 19-20.
Lehpamer, "RFID Design Principles," Artech House, Inc., Norwood, MA, 2008. (310 pages).
Gao, Xiang, "Demodulating Communication Signals of Qi-Compliant Low Power Wireless Charger Using MC56F8006 DSC," Freescale Semiconductor Inc., Mar. 2013, Document No. AN4701, Rev. 0, 21 pages.

* cited by examiner

*Primary Examiner* — Rahel Guarino
(74) *Attorney, Agent, or Firm* — Seed IP Law Group LLP

(57) ABSTRACT

An electronic device receives wireless signals encoded with data in an amplitude-shift keying format. The electronic device passes the wireless signals through a low-pass filter. The low-pass filter has a cutoff frequency between a first frequency associated with data values of a first type and a second frequency associated with data values of a second type. The low-pass filter has the effect of changing the wireless signal from the amplitude-shift keying format to an on-off keying format without losing the data. The electronic device decodes the data from the wireless signal in the on-off keying format.

20 Claims, 6 Drawing Sheets

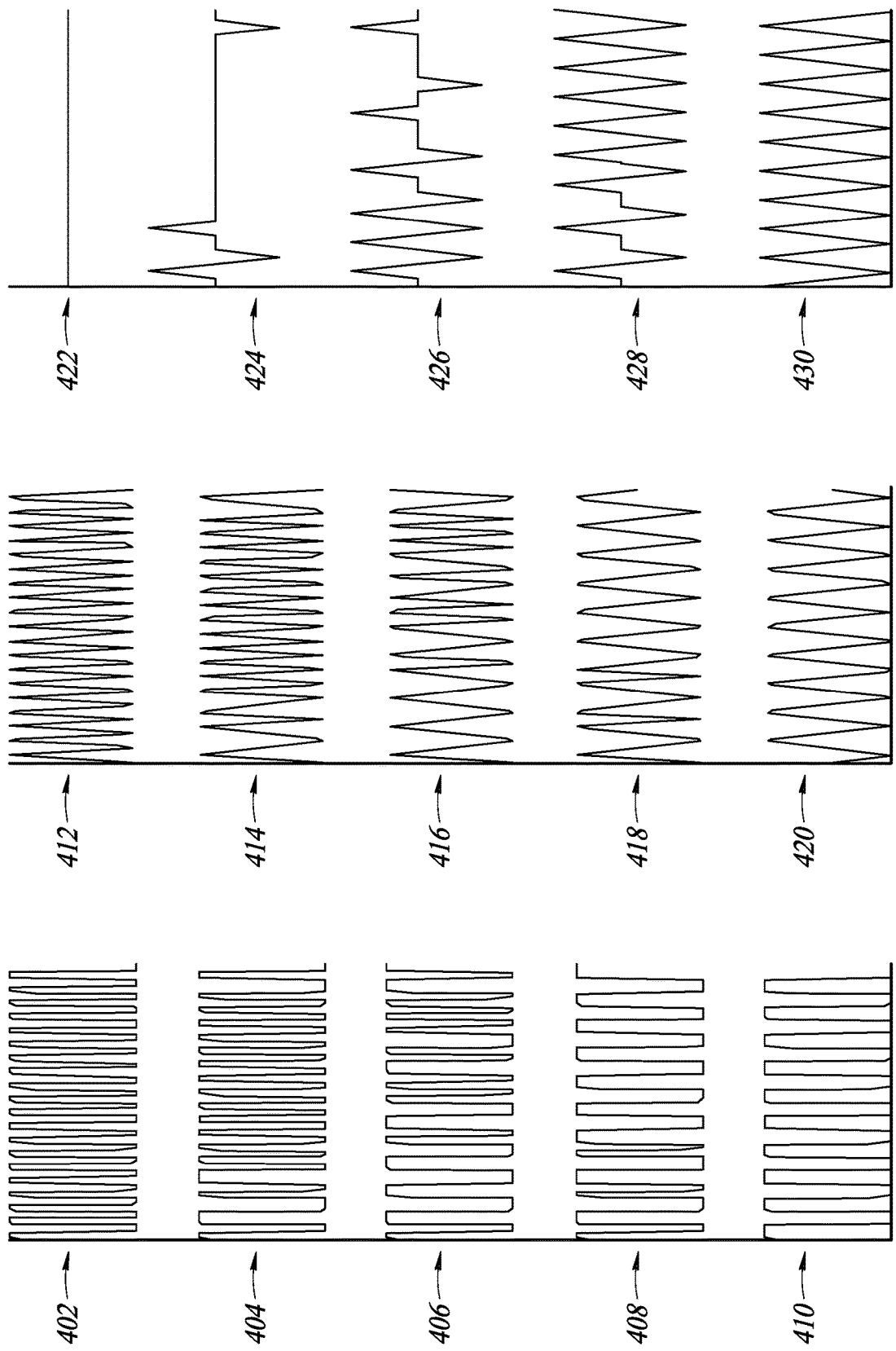

DEVICE AND METHOD FOR DECODING DATA FROM WIRELESS SIGNALS

BACKGROUND

Technical Field

The present disclosure relates to the field of wireless communication. The present disclosure relates more particularly to wireless communication between two nearby devices.

Description of the Related Art

Wireless communication signals are transmitted from a transmitting device to a receiving device. In many cases, the transmitting device transmits a carrier signal. One broad category of modulation schemes is amplitude-shift keying (ASK). In an ASK modulation scheme, information is transmitted by modulating the amplitude of the carrier signal. A low amplitude may signify a binary value of 0. A high amplitude may signify a binary value of 1.

Among the category of ASK modulation schemes, there are various subcategories. In some schemes, information is transmitted not by the amplitude level but by transitions in the amplitude of the carrier signal (Manchester encoding). The advantage is that transitions support the recovery of the clock, and for this reason these schemes are also called self-clocking. For example, a binary 0 may be encoded as binary 01, which corresponds to a low to high transition. A binary 1 may be encoded as binary 10, which corresponds to a high to low transition. Transitions happen in the middle of the bit interval to support clock recovery. There can also be transitions at the bit boundary to set the carrier amplitude at the right level. In another case, information is encoded based on the presence or absence of a transition in the middle of the bit interval (Differential Manchester Encoding). For example, a binary 0 may be encoded as binary 00 or 11 (no transition in the middle of the bit interval). A binary 1 may be encoded as binary 01 or 10 (transition is present in the middle of the bit interval). The encoding pattern is chosen to guarantee a transition at the bit boundary to support clock recovery.

One issue that arises in some ASK modulation schemes, is that the modulated carrier may have a larger bandwidth depending on the type of data. For example, in some ASK modulation schemes a stream of binary 1s may be encoded as 10101010 . . . , a stream of binary 0s may be encoded as 01010101 . . . , and alternating 1s and 0s may be encoded as 01100110011 . . . . The latter stream has half the bandwidth with respect to the former two streams.

In some ASK modulation schemes, a stream of binary 1s is encoded as 10101010 . . . and a stream of binary 0s is encoded as 00110011 . . . . Again, the latter stream has half the bandwidth with respect to the former. The effect of this is that at the receiving end, filters with larger bandwidth are utilized and a higher sampling frequency can be called for to decode streams of one type of binary value (e.g. all 0s or all 1s) versus streams of the other type of binary value. This can reduce the performance and increase the cost and complexity of the receiving device.

BRIEF SUMMARY

Embodiments of the present disclosure provide a receiving electronic device of a wireless communication system that decodes data utilizing a receiving bandwidth corresponding to the lower of two frequencies present in a modulated carrier signal received by the receiving device. In particular, the receiving device utilizes a low-pass filter that filters out signal features corresponding to the larger bandwidth. The electronic device accomplishes this without losing the data corresponding to the larger bandwidth.

The receiving electronic device can receive a self-clocked ASK modulated signal and convert the self-clocked ASK modulated signal to an on-off keyed (OOK) signal by passing the ASK signal through the low-pass filter. The higher frequencies are totally rejected by the low-pass filter, resulting in a zero amplitude for bits having the larger modulated bandwidth and a nonzero amplitude for bits having the smaller modulated bandwidth. The bits having the larger modulated bandwidth can be recovered based on the duration of time between nonzero amplitude events.

This provides several benefits. A lower frequency clock can be used in the receiving device without losing the bits associated with the larger bandwidth in the received signal. Out of band noise is more effectively rejected due to the narrower passband of the filters on the receiver side. For the same reason, very near interferents can also be rejected. Thus, a receiving device in accordance with principles of the present disclosure is more power efficient and more tolerant to noise.

The bitrate and the corresponding bandwidth can be too large for a communication channel, or the bandwidth offered by the communication channel can be too narrow to allow the bits having the larger modulated bandwidth pass without distortion. A receiving device in accordance with principles of the present disclosure would still be able to receive and decode the data stream without errors.

BRIEF DESCRIPTION OF THE SEVERAL VIEWS OF THE DRAWINGS

FIG. 4A is a plurality of graphs illustrating various signals modulated in accordance with a differential Manchester ASK modulation scheme.

FIG. 4B is a plurality of graphs illustrating the signals of FIG. 4A passed through an ASK of a receiving device, according to one embodiment.

FIG. 4C is a plurality of graphs illustrating the signals of FIG. 4A process by a receiving device, according to one embodiment.

DETAILED DESCRIPTION

Figure 1:
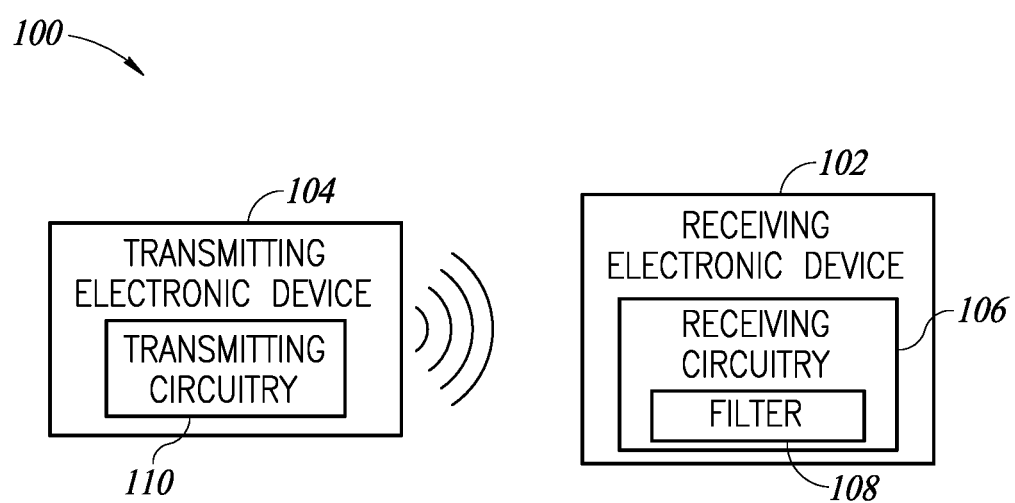
FIG. 1 is a block diagram of a wireless communication system, according to one embodiment.

FIG. 1 is a block diagram of a wireless communication system 100, according to one embodiment. The wireless communication system 100 includes a receiving electronic device 102 and a transmitting electronic device 104. The transmitting electronic device 104 and the receiving electronic device 102 communicate with each other utilizing wireless communication technology.

The receiving electronic device 102 includes receiving circuitry 106. The receiving circuitry 106 receives wireless signals from the transmitting electronic device. The receiving circuitry 106 may include one or more antenna coils, one or more receiving clocks, one or more controllers, and one or more memories. The receiving circuitry 106 enables the receiving electronic device 102 to receive the wireless signal from the transmitting electronic device 104 and to read data encoded into the wireless signal.

The receiving circuitry 106 of the receiving electronic device 102 includes a filter 108. As will be set forth in more detail below, the filter 108 enables the receiving circuitry 106 to receive a wireless signal from the transmitting electronic device 104 including both large bandwidth data values and small bandwidth data values and to filter out features of the large bandwidth data values without losing the data associated with the large bandwidth data values.

Figure 2:
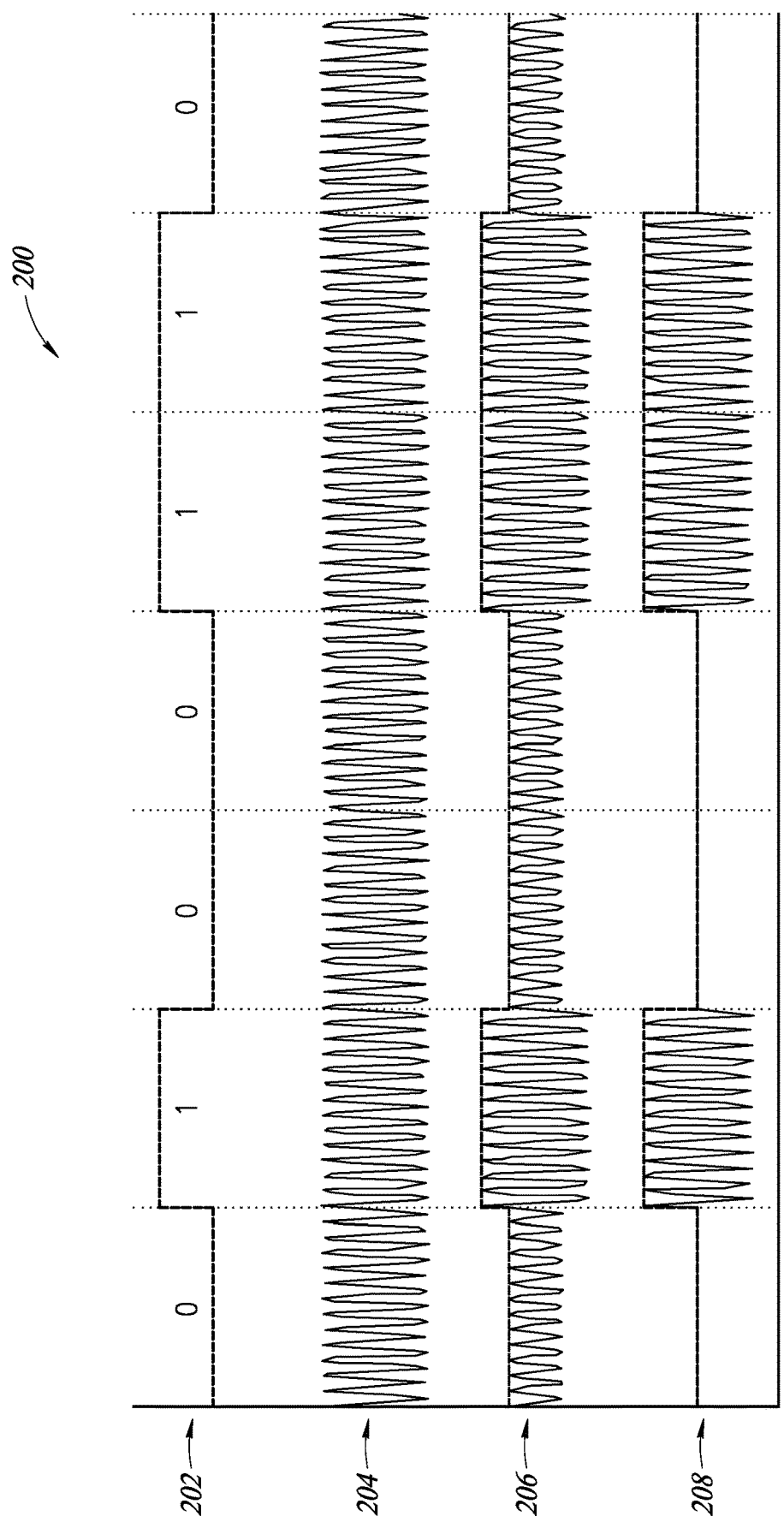
FIG. 2 is a plurality of graphs illustrating a carrier signal and ASK and OOK transmission modulation schemes.

FIG. 2 includes a graph 204 illustrating a carrier signal. With reference to both FIG. 1 and FIG. 2, the graph 204 corresponds to the carrier signal output from the transmitting electronic device 104. The carrier signal is a radiofrequency signal that facilitates wireless communication. The carrier signal may include a substantially sinusoidal waveform, a square waveform, or other types of waveforms.

Data may be encoded into the carrier signal by the transmitting electronic device 104. The data may be encoded into the carrier signal by modulating the carrier signal. Various modulation schemes may be utilized to encode data into the carrier signal.

One type of modulation scheme is an ASK modulation scheme. The graph 206 in FIG. 2 illustrates a basic ASK modulation scheme. In the ASK modulation scheme, data is encoded into the carrier signal by modulating the amplitude of the carrier signal. The graph 202 of FIG. 2 illustrates a series of data values. The graph 206 illustrates the amplitude of the carrier signal during each of these data values. A binary 0 is encoded into the carrier signal by reducing the amplitude of the carrier signal. A binary 1 is encoded to the carrier signal by either increasing the amplitude of the carrier signal or by maintaining the carrier signal at the standard amplitude. As can be seen from the graph 206 and 202, when the encoded value is binary zero, the carrier signal in the graph 206 has a low amplitude. When the encoded value is a binary 1, the carrier signal of the graph 206 has a high amplitude, or an amplitude substantially equal to the unmodulated carrier signal. Alternatively, binary is can be encoded with low amplitudes and binary 0s can be encoded with high amplitudes. As will be set forth in more detail below, there are various types of modulation schemes that fit in the category of ASK modulation schemes.

Another type of modulation scheme is an OOK modulation scheme. The graph 208 in FIG. 2 illustrates the basic concepts of an OOK modulation scheme. In the OOK modulation scheme, data is encoded into the carrier signal by turning the carrier signal on and off. A data value of 0 may be encoded into the carrier signal by entirely turning off the carrier signal or reducing the amplitude of the carrier signal to substantially zero. A data value of 1 may be encoded into the carrier signal by turning on the carrier signal. Accordingly, the amplitude of the carrier signal is reduced to zero when encoding a 0 into the carrier signal. The amplitude of the carrier signal is maintained at the standard level when a 1 is encoded into the carrier signal. Alternatively, a 1 may be encoded by turning off the carrier signal and the 0 may be encoded by turning on the carrier signal.

In some cases, the level of the carrier signal is not enough to enable the receiving electronic device 102 to decode the data encoded into the carrier signal. Knowing the sampling clock, i.e., the bit boundaries and interval by which data is encoded into the carrier signal, enables the receiving electronic device 102 to sample and decode the data from the carrier signal. The clock signal could be sent separately from the carrier signal in order to keep synchronization and avoid bit slips. The clock signal can also be sent together with the data by using certain types of encoding.

One example of a self-clocking ASK scheme is Manchester encoding. In Manchester encoding, information is transmitted by transitions in the amplitude of the signal carrier. In particular, the direction of the transition determines the bit. For example, 0 is encoded as 01 which corresponds to a low-to-high transition, 1 is encoded as "10" which corresponds to a high-to-low transition. There is always a transition in the middle of the bit interval. The clock signal can be extracted from the transitions. Transitions may also happen at the bit boundary to set the carrier at the right level.

Another example of a self-clocking ASK encoding scheme is differential Manchester encoding. In differential Manchester encoding, information is again transmitted by transitions in the amplitude of the carrier signal, but in this case, the presence or absence of a transition in the middle of the bit interval determines the bit. For example, 0 is encoded as 00 or 11 without a transition in the middle. 1 is encoded as 01 or 1 with a transition in the middle. The encoding pattern is chosen to guarantee the transition at the bit boundary. For this reason the clock signal can be extracted from the presence of a transition at the bit boundary.

Figure 3:
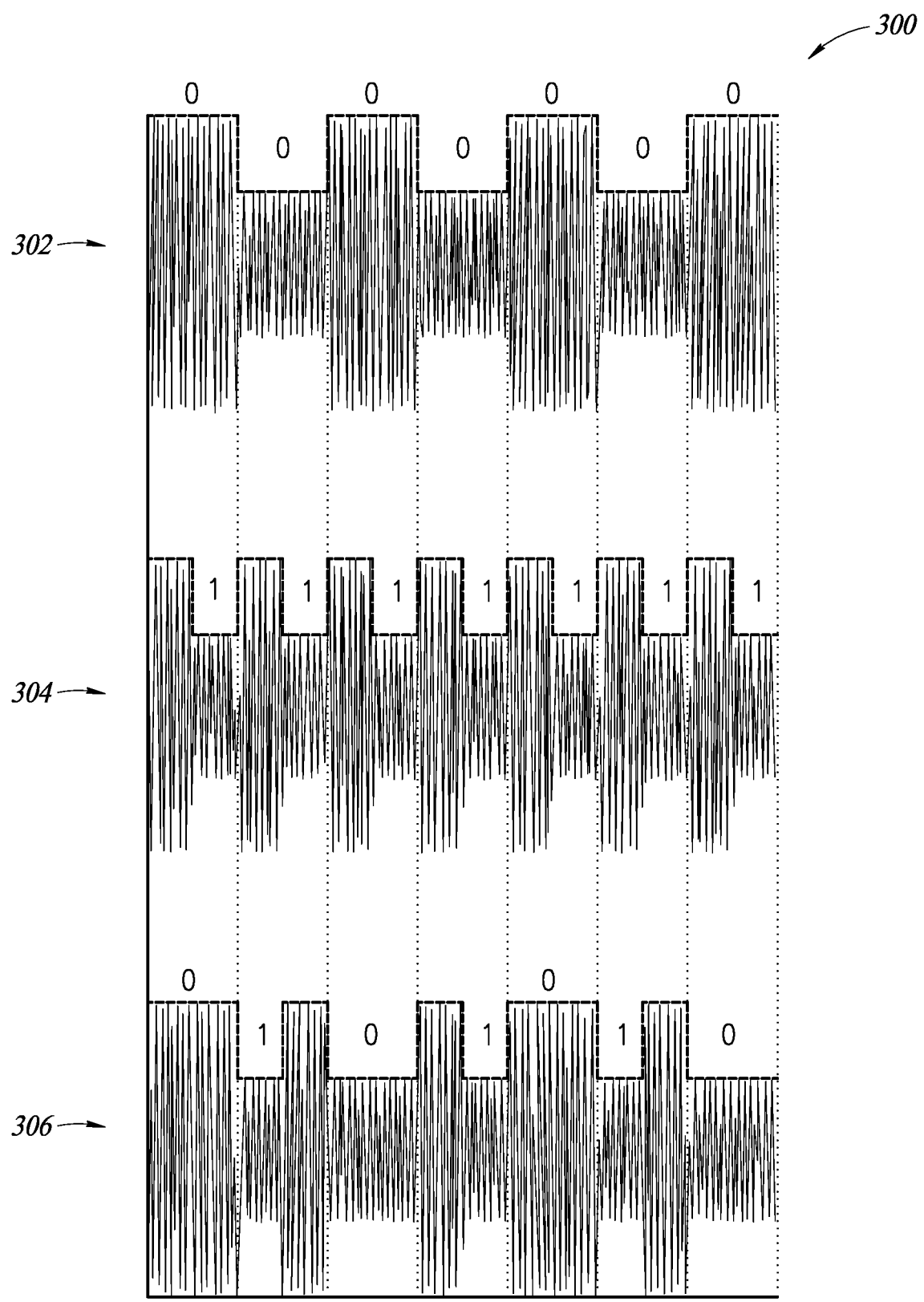
FIG. 3 includes a plurality of graphs illustrating various data patterns with differential Manchester encoding, according to one embodiment.

FIG. 3 includes a plurality of graphs illustrating various data patterns with differential Manchester encoding, according to one embodiment. Graph 302 illustrates a series of all 0s encoded into the carrier signal with differential Manchester encoding. Graph 304 illustrates a series of all is encoded into the carrier signal with differential Manchester encoding. Graph 306 includes a mix of 0s and 1s.

As can be seen from graphs 302 and 304, a sequence of all is utilizes twice the bandwidth as a sequence of all 0s in differential Manchester encoding. The pulse width of a 1 is half the pulse width of a 0. Accordingly, the frequency associated with binary is in differential Manchester encoding is effectively double the frequency associated with binary 0s in differential Manchester encoding.

With reference to FIGS. 1 and 3, if the transmitting electronic device 104 transmits data by encoding the carrier signal with a differential Manchester encoding scheme, then the receiving electronic device 102 could be expected to utilize a receiving clock or sampling rate associated with the higher frequency of the binary 1s. However, in some cases it may not be possible, or may be too power intensive, for a receiving electronic device to utilize the higher frequency or sampling. Also in some case the transmission channel may not offer the large bandwidth that would typically be utilized by the high frequency in the modulated carrier, therefore the received waveform is heavily distorted.

The receiving electronic device 102 overcomes these drawbacks by utilizing the filter 108. In particular, the receiving electronic device 102 utilizes the filter 108 to filter out all frequencies higher than the frequency associated with the binary 0s in the differential Manchester encoding scheme. The low-pass filter 108 is, thus, a low-pass filter with a cutoff frequency between the lower frequency associated with the binary 0s and a higher frequency associated with the binary 1s.

The electronic device 102 effectively converts the ASK modulated wireless signal received from the transmitting electronic device 104 to an OOK modulated signal. In particular, because signal features associated with 1s are filtered out by the filter 108, the signal becomes an OOK signal in which 1s have zero amplitude and 0s have nonzero amplitude. The 0s have nonzero amplitude because they have a frequency that is less than a cutoff frequency of the low-pass filter 108.

Because the electronic device 102 converts the ASK modulated signal to an OOK modulated signal in which only the 0s have amplitude, the receiving electronic device 102 does not need a sampling rate associated with the higher frequency of the 1s in the differential Manchester ASK signal received from the transmitting electronic device 104. The receiving electronic device 102 can extract the 1s from the OOK signal in substantially the same manner as extracting 0s in traditional OOK signals. In particular, a gap between nonzero amplitude features, or the gap between a falling edge and a rising edge of the OOK signal indicates the presence of one or more binary 1s. The time duration or length of the gap between nonzero amplitudes or high amplitudes indicates the number of 1s present.

FIG. 4A includes graphs of a plurality of wireless signals received by the receiving electronic device 102 from the transmitting electronic device 104 and initially demodulated, according to one embodiment. Before demodulation, the signals of FIG. 4A were received in a differential Manchester ASK encoding scheme. The graph 402 represents a stream of all 1s. The graph 404 represents a mixed stream of 1s and 0s, with more is than 0s. The graph 406 represents a mixed stream of 1s and 0s with substantially equal numbers of 1s and 0s. The graph 408 represents a mixed stream of 1s and 0s, with more 0s than 1s. The graph 410 represents a stream of all 0s. The graphs 402-410 illustrate the frequency differences associated with 0s and is in the differential Manchester encoding scheme. In particular, the frequency associated with 1s is substantially double the frequency associated with 0s.

FIG. 4B includes graphs corresponding to the signals of FIG. 4A after being passed through an edge detector, according to one embodiment. The graph 412 corresponds to the graph 402 after being passed through the edge detector. The graph 414 corresponds to the graph 404 after being passed through the edge detector. The graph 416 corresponds to the graph 406 after being passed through the edge detector. The graph 418 corresponds to the graph 408 after being passed through the edge detector. The graph 420 corresponds to the graph 410 after being passed through the edge detector. The edge detector may be part of the receiving circuitry 104 of the receiving electronic device 102 of FIG. 1.

FIG. 4C includes graphs corresponding to the signals of FIG. 4B after being passed through the low-pass filter 108 of the receiving electronic device 102 of FIG. 1, according to one embodiment. The graph 422 corresponds to the graph 412 after being passed through the low-pass filter 108. The graph 424 corresponds to the graph 414 after being passed through the low-pass filter 108. The graph 426 corresponds to the graph 416 after being passed through the low-pass filter 108. The graph 428 corresponds to the graph 418 after being passed through the low-pass filter 108. The graph 430 corresponds to the graph 420 after being passed through the low-pass filter 108.

FIG. 4C illustrates that the higher frequency features associated with the numeral 1s are entirely absent after being passed to the low-pass filter 108. The graph 422 illustrates that a stream of all is results in a signal having no amplitude. The graph 430 illustrates that a stream of all 0s results in a signal having a frequency associated with the lower frequency of the 0s of the differential Manchester encoding scheme. In each of the signals 422-430, the higher frequency features associated with is in the differential Manchester encoding scheme are gone.

The graphs of FIG. 4C correspond to an OOK modulated signal. In the OOK signals of FIG. 4C, 1s are represented by durations of substantially no amplitude. In the OOK signals of FIG. 4C, 0s are represented by durations of nonzero amplitude. As described previously, is can be extracted from the OOK signal by determining the duration of substantially zero amplitude periods between nonzero amplitude periods. In practice, other signal processing or conditioning may be performed on the signals of FIG. 4C prior to the decoding or retrieving the data from the OOK signal. For example, signal processing or conditioning may convert the sharp features of the graphs 422-430 to substantially square wave like features. Various other types of signal processing or conditioning may be performed without departing from the scope of the present disclosure.

While embodiments have been described in which differential Manchester encoded signals are converted to an OOK signal in which is have no amplitude and 0s have nonzero amplitude, other types of encoding schemes can be utilized without departing from the scope of the present disclosure. For example, other types of ASK encoding signals can be converted to other types of OOK signals.

One benefit of the narrower bandwidth associated with the filter 108 is that more out-of-band noise is rejected. Another benefit is that very near interferents can be rejected. An interferent at the bit rate frequency can also be rejected. These interferents may be created by non-linearities in a transmission channel or in analog receiving and demodulation circuits (mixers and filters). Interferents created by non-linearities are very difficult to remove by means of linear processing techniques, such as adaptive equalization filters. Adaptive filters may fail to converge to the correct solution and even when they converge, the linear compensation of non-linearities may be insufficient. Application of the filter 108 the receiving electronic device 102 more tolerant to noise, and robust against near interferents and especially interferents created by non-linearities. This implementation is non-adaptive and eliminates the probabilistic behavior of adaptive filters which may fail at run time. This result in a smaller circuit area, lower power consumption, lower bit error rate.

Another benefit is that the receiver in accordance with the disclosure becomes insensitive to distortions associated to larger frequencies when the communication channel has a bandwidth smaller than what would be required to pass the larger frequencies. If everything else is kept equal, the receiver in accordance with the disclosure would support successful decoding of a higher communication bitrate (twice the rate allowed by classic ASK receivers).

In one example, the received signal is sampled and demodulated to have 24 samples per bit interval. Differential Manchester encoding is utilized. The low-pass filter 108 is configured with a cutoff frequency=Fbit (moving average over 12 samples) and with cutoff frequency=Fbit/2 (moving average over 24 samples). The edge detector is a correlator with a step function with 24 samples per bit interval (12 low, 12 high). Following the Differential Manchester encoding, a transition is always guaranteed at the bit boundary. When a 0 is transmitted there is no other transition and the output of the edge detector will have two local maxima or minima separated by a full bit interval. When a 1 is transmitted there is also a transition in the middle of the bit interval and the output of the edge detector will have three local maxima or minima separated by half bit interval. When the signal is transformed into OOK the 1 will cause the output to be flat and the 0 will cause the output to have just one local maximum or minimum. To avoid bit slips and ensure synchronization, long sequences of 1s could be avoided. This can be obtained by bit stuffing techniques or by suitable encoding, such as adding an even parity bit every N bits, where N is an even number.

Figure 5C:
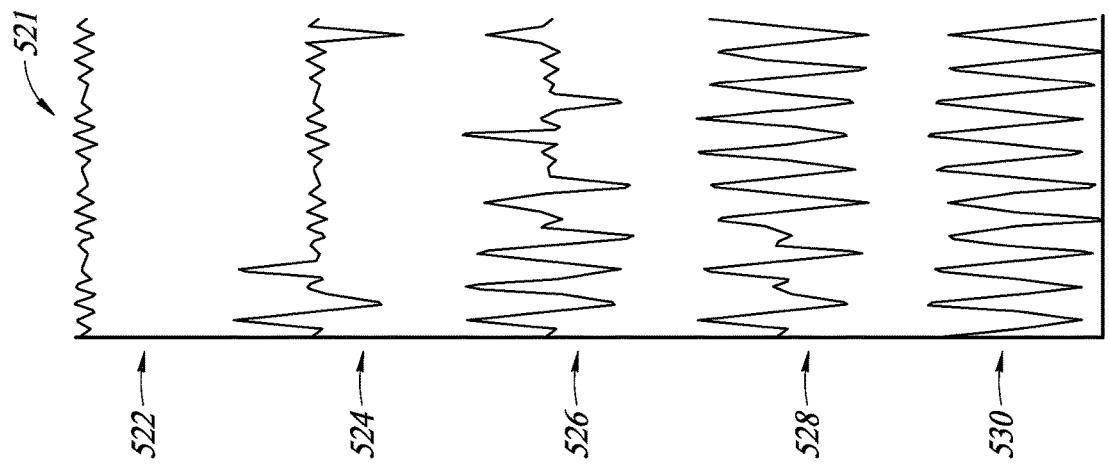
FIGS. 5A-5C are a plurality of graphs illustrating the signals of FIGS. 4A-4C after noise has been introduced into the signals, according to one embodiment.
Figure 5B:
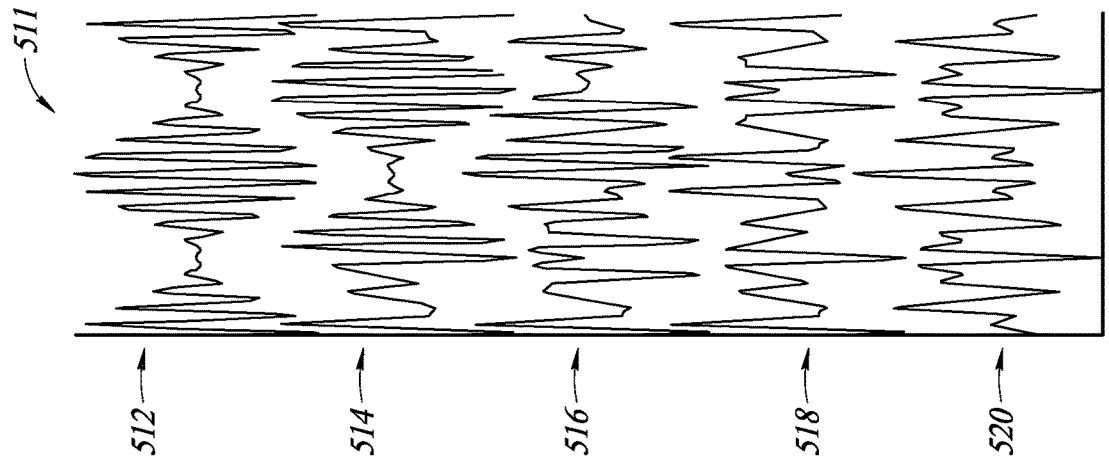
Figure 5A:
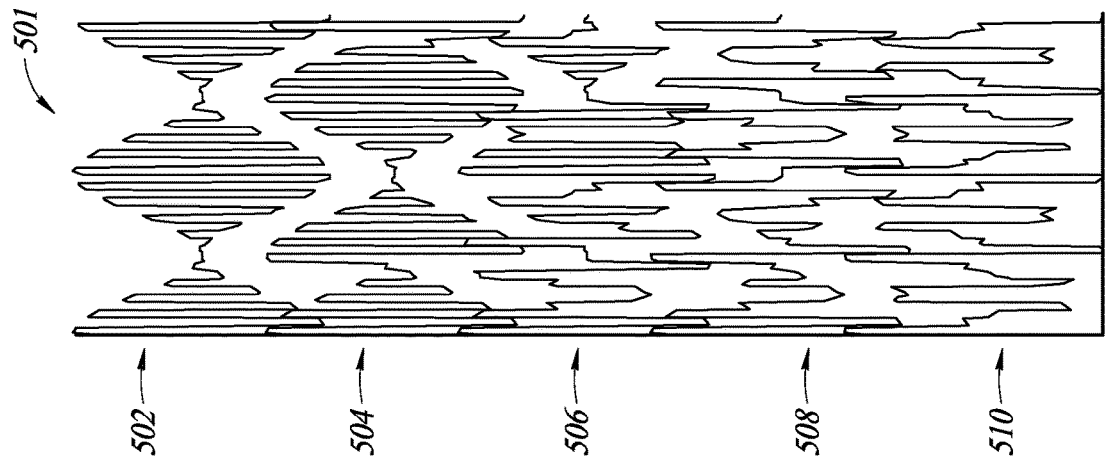

FIGS. 5A-5C are graphs illustrating signals associated with FIGS. 4A-4C, with interferents added into the signals, according to one embodiment. More particularly, graphs 502-510 of FIG. 5A correspond to graphs 402-410 of FIG. 4A, but with interferents included in the signals. The interferents distort the signals in the graphs 502-510. The graphs 512-520 correspond to the graphs 412-420 of FIG. 4B, but with interferents added into the signals. The graphs 522-530 corresponds to the graphs 422-430, after interferents have been added into the signals of FIG. 5A. Notably, the graphs 522-530 illustrate that the low-pass filter significantly reduces the effects of interferents, as the graphs 522-530 strongly match the graphs 422-430 but with small amounts of noise. So small amounts of noise will not prevent accurately the coating the data from the signals.

Returning to FIG. 1, in one embodiment, the transmitting electronic device 104 is a wireless charging device. In this case, the carrier signal is configured to provide energy to the receiving electronic device 102. For example, when the receiving electronic device 102 is placed adjacent to the transmitting electronic device 104, the transmitting electronic device 104 outputs the carrier signal. The receiving electronic device 102 includes energy harvesting circuitry that harvests energy from the carrier signal. The carrier signal may also be termed a wireless charging signal in this case. The receiving electronic device 102 may generate a charging current from the carrier signal.

In one embodiment, the wireless charging circuitry operates in accordance with a Qi wireless charging standard. The Qi wireless charging circuitry outputs a charging field in a range between 100 kHz and 500 kHz, though other frequencies may be used as standards are adjusted or as differing applications call for other frequencies outside this range. Data can be encoded into the charging field with a lower frequency than the frequency of the charging field. The low-pass filter will effectively filter out effects of the higher frequency charging field when the coding data from the charging field. Other wireless charging standards can be utilized without departing from the scope of the present disclosure.

In one embodiment, the transmitting electronic device 104 and the receiving electronic device 102 are near field communication (NFC) devices. In particular, the transmitting electronic device 104 outputs an NFC carrier signal with interrogation data encoded into the carrier signal. The receiving electronic device 102 receives the carrier signal and decodes a carrier signal utilizing the low-pass filter as described previously. The receiving electronic device and the transmitting electronic device 104 can communicate with each other the NFC protocols. In one example, the NFC carrier signal has a frequency of 13.56 MHz. However, other frequencies for the carrier signal can be utilized without departing from the scope of the present disclosure. Data is encoded into the carrier signal at a lower frequency than the frequency of the carrier signal. Accordingly, the low-pass filter can effectively reject effects of the higher frequency NFC carrier signal when the coding data from the NFC carrier signal. The receiving electronic device 102 may include an active NFC device or a passive NFC device.

While FIG. 1 as illustrated a transmitting electronic device 104 and the receiving electronic device 102, in practice, the receiving electronic device may also transmit data to the transmitting electronic device 104. Accordingly, the transmitting electronic device 104 and the receiving electronic device may each both transmit and receive data from the other. Accordingly, the transmitting electronic device 104 and the receiving electronic device 102 may be termed first and second electronic devices.

Figure 6:
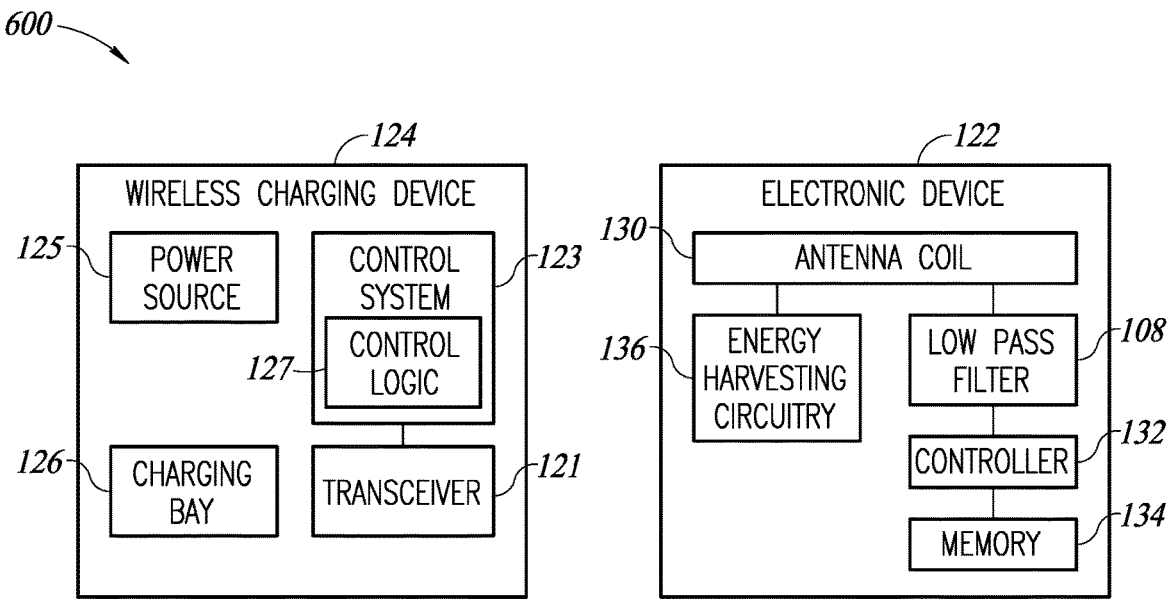
FIG. 6 is a block diagram of a wireless communication system 600, according to one embodiment.

FIG. 6 is a block diagram of a wireless communication system 600, according to one embodiment. The wireless communication system 100 includes an electronic device 122 and a wireless charging device 124. The wireless charging device is one example of a transmitting electronic device 104 of FIG. 1. The electronic device 122 is one example of a receiving electronic device 102 of FIG. 1.

The transmitting electronic device 104 includes a transceiver 121, a control system 123, a power source 125, and a charging bay 126. The control system 123 includes control logic 127. The components of the transmitting electronic device 104 to cooperate together to provide wireless communication and separate wireless charging.

The transceiver 121 enables the wireless charging device 124 to transmit signals and to receive signals. The transceiver 121 can include one or more antennas for transmitting NFC signals and for receiving NFC signals. The transceiver 121 can include additional circuitry for enabling the transceiver 121 to transmit signals including interrogation signals, carrier signals, and other types of signals. The transceiver 121 can include additional circuitry for enabling the transceiver 121 to receive and process signals including interrogation signals and other types of signals from the electronic device 122.

The control system 123 includes control circuitry for controlling the function of the wireless charging device 124. The control system 123 controls the operation of the transceiver 121. The control system 123 controls the transmission of signals with the transceiver 121. The control system 123 also controls the reception of signals with the transceiver 121. The control system 123 can include processing resources, memory resources, and data transmission resources.

The control system 123 includes the control logic 127. The control logic 127 can include instructions for operation of the control system 123. The control logic 127 can include instructions protocols for performing the operations, processes, and methods executed by the wireless charging device 124, including those described herein. The control logic 127 can correspond to software instructions stored in a memory of the wireless charging device 124.

The power source 125 provides power to the wireless charging device 124. The power source 125 can include one or more of an internal battery, a wired power connection to an external power source, and a wireless power connection to an external power source.

The transceiver 121 selectively provides a wireless charging field to the electronic device 122. The transceiver 121 includes one or more antennas. In one embodiment, the transceiver 121 operates in accordance with a Qi wireless charging standard. The Qi wireless charging circuitry outputs a charging field in a range between 87 kHz and 205 kHz. The transceiver 121 may also operate in accordance with charging protocols or standards other than Qi without departing from the scope of the present disclosure.

The transceiver 121 of the wireless charging device 124 can be controlled by the control logic 127 of the control system 123. The RF transceiver selectively outputs the wireless charging field based on the types of NFC devices present as detected by the control system 123.

The charging bay 126 includes a physical area on which an electronic device 122 can be positioned in order to receive wireless charging signals from the wireless charging device 124. When an electronic device 122 is positioned on the charging bay 126, the wireless charging device 124 detects the electronic device 122 and causes the transceiver 121 to begin outputting the wireless charging field.

The electronic device 122 includes an antenna coil 130, a controller 132, energy harvesting circuitry 136, and a memory 134. The antenna coil 130 includes one or more antennas and other circuitry for receiving signals from the wireless charging device 124 and for providing signals to the wireless charging device 124. Accordingly, antenna coil 130 may be part of a transceiver of the electronic device 122.

The controller 132 controls the operation of the antenna coil 130. The controller 132 controls the modulation signals output from the antenna coil 130 responsive to interrogation signals received from the wireless charging device 124. The controller 132 may control modulation of an impedance of the antenna coil 130. The memory 134 stores identification data related to the electronic device 122.

When the antenna coil 130 receives signals from the wireless charging device 124, the energy harvesting circuitry 136 harvests energy from the signals. If the electronic device 122 is an active electronic device, then the electronic device 122 may utilize the energy harvested from the wireless charging signal to provide a charging current to a battery of the electronic device 122. If the electronic device 122 is a passive electronic device, the energy harvested from the wireless charging signal may be utilized to power the other components of the electronic device 122.

In one embodiment, when the antenna coil 130 receives the wireless charging signal, the wireless charging signal is passed to both the energy harvesting circuitry 136 and to the low-pass filter 108 in parallel to each other. The low-pass filter 108 filters out higher frequency signals associated with higher bit rate or bandwidth data values encoding into the wireless charging signal, such as binary 1s in the case of differential Manchester encoding. Accordingly, the low-pass filter 108 effectively transforms the ASK modulated wireless charging signal to an OOK modulated wireless charging signal. The controller or other receiving circuitry can then decode the data from the OOK signal, as described previously. The electronic device 122 may include other circuitry without departing from the scope of the present disclosure.

Figure 7:
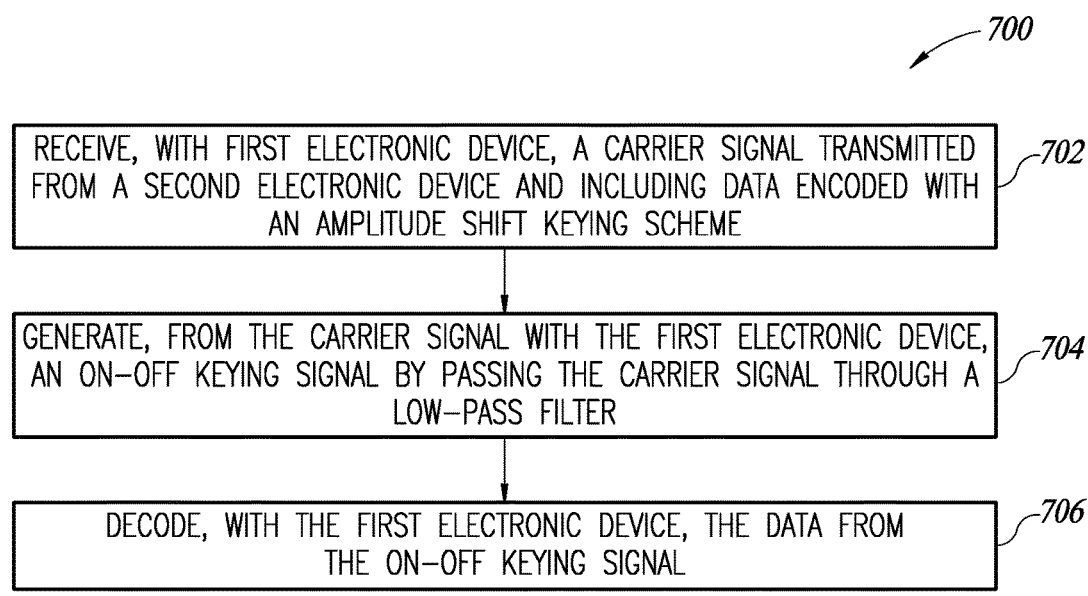
FIG. 7 is a flow diagram of a method for operating a wireless communication system, according to one embodiment.

FIG. 7 is a flow diagram of a method 700 for operating an electronic device, according to one embodiment. The method 700 can utilize components, systems, and processes described in relation to FIGS. 1-6. At 702, the method 700 includes receiving, with a first electronic device, a carrier signal transmitted from a second electronic device and including data encoded with an amplitude-shift keying scheme. At 704, the method 700 includes generating, from the carrier signal with the first electronic device, an on-off keying signal by passing the carrier signal through a low-pass filter. At 706, the method 700 includes decoding, with the first electronic device, the data from the on-off keying signal.

In one embodiment, a method includes receiving, with an electronic device, a carrier signal encoded with data and harvesting energy from the carrier signal with the first electronic device. The method includes passing the carrier signal through a low-pass filter having a cutoff frequency between a first frequency associated with data values of a first type and a second frequency associated with data values of a second type and decoding the data from the carrier signal after passing the carrier signal through the low-pass filter.

In one embodiment, a method includes receiving, with a first electronic device, a carrier signal transmitted from a second electronic device and including data encoded with an amplitude-shift keying scheme. The method includes generating, from the carrier signal with the first electronic device, an on-off keying signal by passing the carrier signal through a low-pass filter and decoding, with the first electronic device, the data from the on-off keying signal.

In one embodiment, an electronic device includes an antenna configured to receive, from a transmitting electronic device, a carrier signal including data encoded with an amplitude-shift keying scheme. The electronic device includes a low-pass filter configured to receive the carrier signal and to generate an on-off keying signal from the carrier signal. The electronic device includes a controller configured to decode the data from the on-off keying signal.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    receiving, with a first electronic device, a carrier signal transmitted from a second electronic device and including data encoded with an amplitude-shift keying scheme;
    generating, from the carrier signal with the first electronic device, an on-off keying signal by passing the carrier signal through a low-pass filter; and
    decoding, with the first electronic device, the data from the on-off keying signal.

2. The method of claim 1, wherein in the on-off keying signal binary 0s are represented by non-zero amplitudes and binary 1s are represented by substantially zero amplitudes.

3. The method of claim 1, wherein the amplitude-shift keying scheme is a differential Manchester scheme.

4. The method of claim 3, wherein in the amplitude-shift keying scheme binary 1s have shorter feature lengths than binary 0s.

5. The method of claim 1, further comprising harvesting energy from the carrier signal with the first electronic device.

6. The method of claim 5, further comprising:
    generating a charging current by harvesting energy from the carrier signal; and
    charging a battery of the first electronic device with the charging current.

7. The method of claim 1, wherein the carrier signal is a Qi protocol carrier signal.

8. The method of claim 1, wherein the carrier signal is a near field communication signal.

9. The method of claim 1, further comprising passing the carrier signal through the amplitude-shift keying scheme of the first electronic device prior to passing the carrier signal through the low-pass filter.

10. The method of claim 1, wherein the low-pass filter has a cutoff frequency greater than a first frequency associated with data values of a first type in the carrier signal and lower than a second frequency associated with data values of a second type in the carrier signal.

11. The method of claim 10, wherein the first type is 0s and the second type is 1s.

12. An electronic device, comprising:
an antenna configured to receive, from a transmitting electronic device, a carrier signal including data encoded with an amplitude-shift keying scheme;
a low-pass filter configured to receive the carrier signal and to generate an on-off keying signal from the carrier signal; and
a controller configured to decode the data from the on-off keying signal.

13. The electronic device of claim 12, further comprising energy harvesting circuitry coupled to the antenna and configured to harvest energy from the carrier signal.

14. The electronic device of claim 13, further comprising a battery coupled to the energy harvesting circuitry, wherein the energy harvesting circuitry generates a charging current from the carrier signal and supplies the charging current to the battery.

15. The electronic device of claim 12, wherein the amplitude-shift keying scheme is a differential Manchester scheme.

16. The electronic device of claim 15, wherein in the amplitude-shift keying scheme binary 1s have shorter feature lengths than binary 0s.

17. The electronic device of claim 12, wherein the carrier signal is a Qi standard carrier signal.

18. A method, comprising:
receiving, with an electronic device, a carrier signal encoded with data;
harvesting energy from the carrier signal with the electronic device;
passing the carrier signal through a low-pass filter having a cutoff frequency between a first frequency associated with data values of a first type and a second frequency associated with data values of a second type; and
decoding the data from the carrier signal after passing the carrier signal through the low-pass filter.

19. The method of claim 18, wherein the carrier signal is encoded with data in an amplitude-shift keying format.

20. The method of claim 19, further comprising:
converting the carrier signal from the amplitude-shift keying format to an on-off keying format by passing the carrier signal through the low-pass filter; and
decoding the data from the carrier signal in the on-off keying format.

* * * * *